United States Patent
Kozora et al.

(10) Patent No.: US 12,465,072 B2
(45) Date of Patent: Nov. 11, 2025

(54) STARCH BLEND

(71) Applicant: Cargill, Incorporated, Wayzata, MN (US)

(72) Inventors: Michelle Kozora, Excelsior, MN (US); Erin Marie Radermacher, Golden Valley, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 859 days.

(21) Appl. No.: 17/260,083

(22) PCT Filed: Jul. 16, 2018

(86) PCT No.: PCT/US2018/030852
§ 371 (c)(1),
(2) Date: Jan. 13, 2021

(87) PCT Pub. No.: WO2020/018061
PCT Pub. Date: Jan. 23, 2020

(65) Prior Publication Data
US 2021/0315246 A1    Oct. 14, 2021

(51) Int. Cl.
*A23L 29/212* (2016.01)
*A23B 2/82* (2025.01)
(Continued)

(52) U.S. Cl.
CPC .............. *A23L 29/212* (2016.08); *A23B 2/82* (2025.01); *A23B 7/045* (2013.01); *A23C 19/14* (2013.01);
(Continued)

(58) Field of Classification Search
CPC ........ A23L 29/212; A23L 19/09; A23L 23/00; A23L 7/109; A23L 3/365; A23B 7/045; A23C 19/14; C98L 3/02; C08L 3/02
See application file for complete search history.

(56) References Cited

U.S. PATENT DOCUMENTS 4,025,657 A    5/1977   Cheng
4,418,090 A *  11/1983  Bohrmann ............ A23L 29/212
                                                    127/71
(Continued)

FOREIGN PATENT DOCUMENTS

AU           554128 B2   8/1986
WO      2016207149 W    12/2016
(Continued)

OTHER PUBLICATIONS

Alan Imeson "Food Stabilisers, Thickeners and Gelling Agents", Saint-Petersburg, "Professya", 2012, 408 pages.
(Continued)

*Primary Examiner* — Stephanie A Kohler
*Assistant Examiner* — Stephanie A Cox

(57) ABSTRACT

A composition and method of making a label friendly starch blend includes a composition having greater than 50 weight percent of a heat moisture treated (HMT) potato starch and less than 50 weight percent of a native tapioca starch. In an example, the starch blend includes between about 60 and about 70 weight percent of the HMT potato starch and between about 30 and about 40 weight percent of the native tapioca starch. The starch blends disclosed herein can be suitable for use in a variety of food products, including, but not limited to, tomato-based sauces, cheese sauces, Asian-style sauces, and gravies, particularly for use in freezer meals. The food products containing the starch blends disclosed herein exhibit favorable properties after being cooked, stored in the freezer and then heated prior to consumption. Observations included favorable viscosity, favorable texture and an absence of syneresis.

19 Claims, 21 Drawing Sheets

(51) Int. Cl.
  *A23B 7/045*   (2006.01)
  *A23C 19/14*   (2006.01)
  *A23L 7/109*   (2016.01)
  *A23L 19/00*   (2016.01)
  *A23L 23/00*   (2016.01)
  *C08L 3/02*   (2006.01)

(52) U.S. Cl.
  CPC ............... *A23L 7/109* (2016.08); *A23L 19/09* (2016.08); *A23L 23/00* (2016.08); *C08L 3/02* (2013.01); *A23V 2002/00* (2013.01); *C08L 2205/025* (2013.01)

(56) References Cited

U.S. PATENT DOCUMENTS

| | | | | |
|---|---|---|---|---|
| 4,491,483 | A * | 1/1985 | Dudacek | ............... A23L 29/219 |
| | | | | 127/71 |
| 2013/0337118 | A1* | 12/2013 | Sistrunk | ................. A23L 19/18 |
| | | | | 426/94 |
| 2018/0249748 | A1* | 9/2018 | Sharma | ................. A23L 29/212 |

FOREIGN PATENT DOCUMENTS

| | | |
|---|---|---|
| WO | 2017046301 W | 3/2017 |
| WO | 2018069535 A1 | 4/2018 |

OTHER PUBLICATIONS

By 18293 C1 (State Scientific Institution Institute of General and Inorganic Chemistry of the National Academy of Sciences of Belarus.

* cited by examiner

MARINARA CONTROL SAMPLE WITH POLARTEX 06732 F/T CYCLE 1

MARINARA CONTROL SAMPLE WITH POLARTEX 06732 F/T CYCLE 5

MARINARA CONTROL SAMPLE WITH POLARTEX 06732 F/T CYCLE 10

MARINARA TEST SAMPLE WITH POTATO/TAPIOCA BLEND F/T CYCLE 1

MARINARA TEST SAMPLE WITH POTATO/TAPIOCA BLEND F/T CYCLE 5

MARINARA TEST SAMPLE WITH POTATO/TAPIOCA BLEND F/T CYCLE 10

CHEESE CONTROL SAMPLE
WITH POLARTEX 06732
F/T CYCLE 1

CHEESE CONTROL SAMPLE
WITH POLARTEX 06732
F/T CYCLE 5

CHEESE CONTROL SAMPLE WITH POLARTEX 06732 F/T CYCLE 10

CHEESE TEST SAMPLE WITH POTATO/TAPIOCA BLEND F/T CYCLE 1

CHEESE TEST SAMPLE WITH POTATO/TAPIOCA BLEND F/T CYCLE 5

CHEESE TEST SAMPLE WITH POTATO/TAPIOCA BLEND F/T CYCLE 10

STARCH BLEND

CROSS REFERENCE TO RELATED APPLICATION

This application is a national phase application of PCT Application No. PCT/US2018/030852, filed Jul. 16, 2018, which claims the benefit of U.S. Provisional Application No. 62/500,767, filed May 3, 2017, each of which is incorporated by reference herein in its entirety.

TECHNICAL FIELD

The present patent application relates to the field of starch compositions for use in food products and, more particularly, relates to a label friendly starch blend of tapioca starch and potato starch.

BACKGROUND

Starch is a common food ingredient given its properties to facilitate thickening, gelling, and moisture-retention, and its suitability as a texturant. Starch is a carbohydrate polymer and can consist essentially of amylose and/or amylopectin. The major component (about 70-80%) of most starches is amylopectin, which is a branched polymer of several thousand to several hundred thousand glucose units. Amylose is the minor component (about 20-30%) of most starches. However, there are high amylose starches with 50-70% amylose. Amylose is essentially a linear glucose polymer of several hundred to several thousand glucose units.

Sources of starch include but are not limited to fruits, seeds, and rhizomes or tubers of plants. Common sources of starch include but are not limited to rice, wheat, corn, potatoes, tapioca, arrowroot, buckwheat, banana, barley, cassava, kudzu, oca, sago, sorghum, sweet potatoes, taro and yams. Edible beans, such as favas, lentils and peas, are also rich in starch.

Some starches are classified as waxy starches. A waxy starch consists essentially of amylopectin. Common waxy starches include waxy corn starch, and waxy wheat starch. An instant starch is one that swells and develops increased viscosity in solution without heating. Instant starches are used, for example, in instant puddings.

A native starch is one that has been isolated from its plant source without altering its chemical structure. A modified starch has a structure that has been altered from its native state, resulting in modification of one or more of its chemical or physical properties. Starches may be modified, for example, by enzymes, oxidation or, substitution with various compounds. For example, starches can be modified to increase stability, improve texture, increase or decrease viscosity, and/or increase or decrease solubility, among others. Modified starches may be partially or completely degraded into shorter chains. In one example, modified starches are cross-linked for example to improve stability. Starches that are modified by substitution have a different chemical composition.

A starch can undergo a heat-moisture treatment (HMT), which can physically change the physicochemical properties of the starch but not destroy the starch's granular structure. Such physical modifications do not require chemical modification but can result in the starch having certain attributes similar to chemically modified starches. HMT can result in a widening of a gelatinization temperature of the starch, a reduction in granular swelling and increased thermal stability. HMT can be considered a natural process and an HMT starch can be regarded as a clean label starch.

There is an increased demand from consumers for clean label starches, such as native or physically modified, to replace chemically-modified food starches commonly used in various food products.

Overview

The present inventors recognize, among other things, an opportunity for a label-friendly starch blend of potato starch and tapioca starch suitable for use in food products and having properties similar to a modified starch.

Examples according to the present application can include a starch composition comprising a heat-moisture treated (HMT) potato starch in an amount ranging between about 60 and about 70 weight percent of the starch composition, and a native tapioca starch in an amount ranging between about 30 and about 40 weight percent of the starch composition. In an example, the HMT potato starch ranges between about 63 and about 67 weight percent of the starch composition and the native tapioca starch ranges between about 33 and about 37 weight percent of the starch composition. In an example, the HMT potato starch ranges between about 63 and about 65 weight percent of the starch composition and the native tapioca starch ranges between about 35 and about 37 weight percent of the starch composition. In another example, the HMT potato starch is about 64 weight percent of the starch composition and the native tapioca starch is about 36 weight percent of the starch composition. In an example, a food product can include the starch composition described above and the food product can be cooked, stored in a freezer, and then heated at a future date for consumption. The food product can include, but is not limited to, tomato-based sauces, cheese sauces, Asian-style sauces, and gravies.

Examples according to the present application can include a starch blend comprising a potato starch in a first amount, the potato starch having undergone a heat-moisture treatment prior to forming the blend, and a native tapioca starch in a second amount. The first and second amounts can each be defined in terms of a weight percent of the blend, and the first amount is greater than the second amount. In an example, the first amount is equal to or greater than about 60 weight percent and the second amount is less than or equal to about 40 weight percent. In an example, the first amount is equal to or greater than about 63 weight percent and the second amount is less than or equal to about 37 weight percent. In an example, the first amount ranges between about 63 and 64 weight percent and the second amount ranges between about 36 and 37 weight percent. In an example, the food product is a sauce. The food product can be acidic (pH about 4.5 or less) or non-acidic (pH about 5.6 or more).

Examples according to the present application can include a method of making a label friendly starch blend and the method can include producing or providing a heat-moisture treated (HMT) potato starch, producing or providing a native tapioca starch, and blending the HMT potato starch with the native tapioca starch to form a starch blend comprising a first amount of the HMT potato starch and a second amount of the native tapioca starch. The first and second amounts can each be defined in terms of a weight percent of the blend, and the first amount is greater than the second amount. In an example, the first amount is equal to or greater than about 60 weight percent and the second amount is less than or equal to about 40 weight percent.

Examples according to the present application can include a method of making a food product containing a label friendly starch and the method can include producing or providing a starch blend comprising a heat-moisture treated (HMT) potato starch and a native tapioca starch, the HMT potato in an amount ranging between about 60 and about 70 weight percent of the starch blend and the native tapioca starch in an amount ranging between about 30 and about 40 weight percent of the starch blend. The method can further include combining the starch blend with one or more additional food ingredients, heating the starch blend and the one or more additional food ingredients to form the food product, and freezing the food product prior to delivering the food product to a retailer or a consumer. In an example, the food product is a first food product and the method further comprises combining the first food product with a second food product to form a freezer meal. In an example, the first food product is a sauce. In an example, the method can further comprising storing the food product in a freezer for a period of time, removing the food product from the freezer, and preparing the food product for consumption. Preparation can include heating the food product in an oven or microwave.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
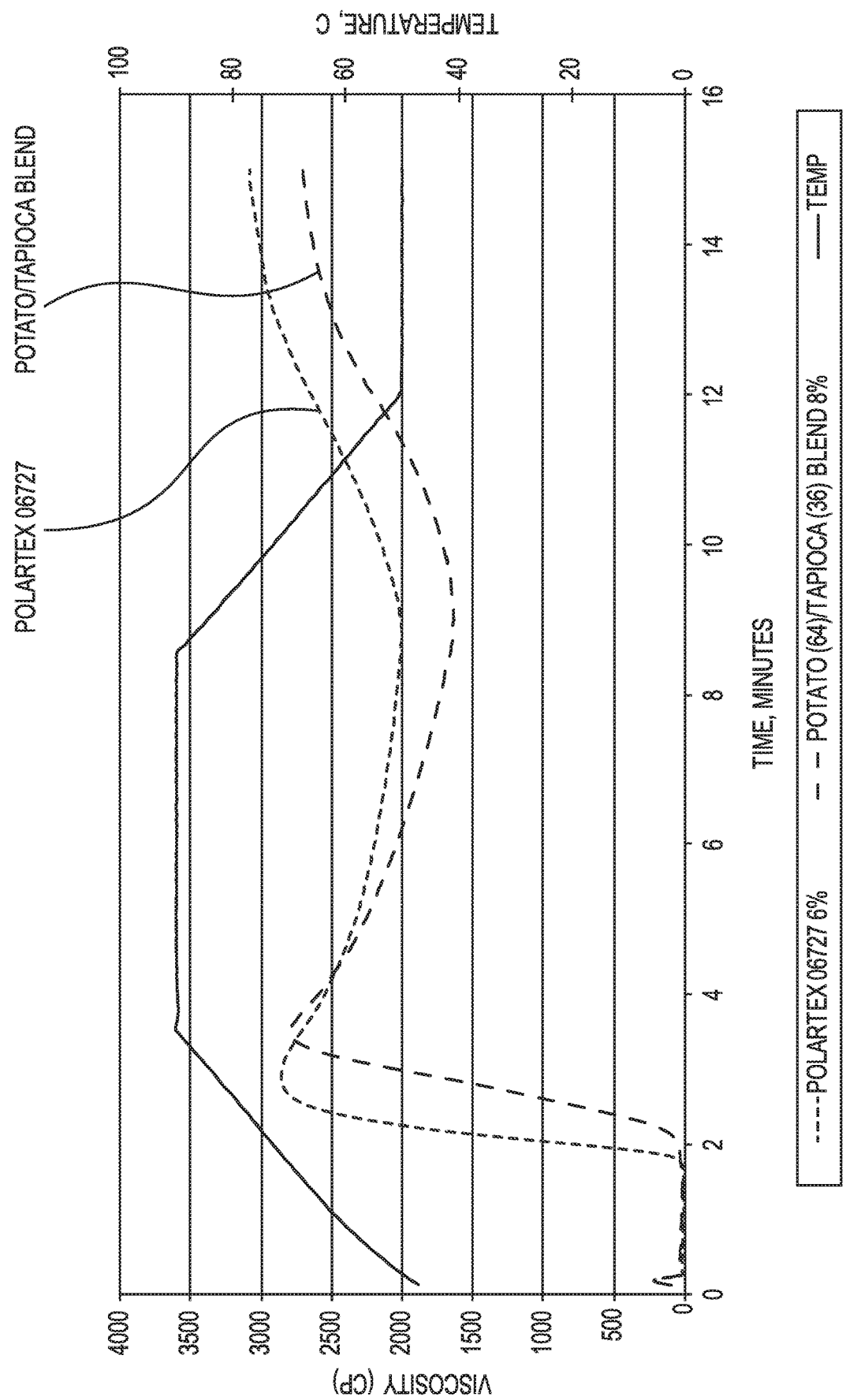
FIG. 1A is a plot of the viscosity profile, as a function of time and temperature, for a starch blend of potato starch and tapioca starch, compared to the viscosity profile for a modified starch, both at an acidic pH.

The present application provides a starch composition comprising a blend of potato starch and tapioca starch. In an example, the potato starch is a heat moisture treated (HMT) potato starch. In an example, the tapioca starch is a native tapioca starch. In some cases, neither potato starch nor tapioca starch, when used individually in a food product, provide significant benefits to the food product. However, the present inventors unexpectedly found that a starch blend of HMT potato starch and native tapioca starch can have a synergistic effect and properties similar to a modified starch. The starch blend of HMT potato starch and native tapioca starch can be suitable for use in a food product, particularly if the amount of potato starch in the blend is greater than the amount of tapioca in the blend. As described further below, a viscosity from the potato starch in combination with a stability of the tapioca starch can result in a starch blend exhibiting similar functionality to a chemically modified food starch. The starch blends disclosed herein can be used in, for example, frozen meals, which can commonly have a shelf life of about 4 to 6 months. As demonstrated herein, the starch blends exhibit stability after undergoing a freeze/thaw process, thus confirming the belief that such starch blends are well suited for use in frozen meals in which the food product can be stored in a freezer for a significant period of time and then heated in a microwave or oven prior to being consumed by the user.

The starch blends disclosed herein can be suitable in many different food products, examples of which are provided below. Because a heat moisture treatment is a physical modification to the potato starch, rather than a chemical modification, the starch blends disclosed herein can provide a label friendly starch solution for the food product that such blends are used in. In an example, the starch blends disclosed herein can be used in food products (neutral or acidic) that undergo kettle cooking and then freezing, followed by heating (in an oven or microwave) at a later date. Such food products can include, for example, various types of sauces for use in freezer meals. Such sauces can include, but are not limited to, tomato-based sauces, cheese sauces, Asian-style sauces, and gravies. For purposes herein, "label friendly" generally means that the starch, or the food product the starch is contained within, is natural and not chemically modified. For purposes herein, "sauce" generally refers to a thick liquid served with food to add moistness and flavor. Typically a sauce includes texturizers such as flour or starch.

In an example, the starch composition can comprise HMT potato starch at a first amount (by weight percent) and native tapioca starch at a second amount (by weight percent), with the first amount being greater than the second amount. In an example, the first amount can range between about 51 and about 70 weight percent, and the second amount can range between about 30 and about 49 weight percent. In an example, the first amount can range between about 55 and about 70 weight percent, and the second amount can range between about 30 and about 45 weight percent. In an example, the first amount can range between about 60 and about 70 weight percent, and the second amount can range between about 30 and about 40 weight percent. In an example, the first amount can range between about 60 and about 67 weight percent, and the second amount can range between about 33 and about 40 weight percent. In an example, the first amount can range between about 60 and about 65 weight percent, and the second amount can range between about 35 and about 40 weight percent. In an example, the first amount can range between about 62 and about 65 weight percent, and the second amount can range between about 35 and about 38 weight percent. In an example, the first amount can range between about 62 and about 64 weight percent, and the second amount can range between about 36 and about 38 weight percent. In an example, the first amount can range between about 63 and about 64 weight percent, and the second amount can range between about 37 and about 38 weight percent. In an example, the first amount can be 63.6 weight percent and the second amount can 36.3 weight percent.

In an example, the starch blend of the present application can include 63.64 percent (by weight) HMT potato starch and 36.36 percent (by weight) native tapioca starch; this particular blend can also be referred to herein as 64 percent HMT potato starch and 36 percent native tapioca starch. Examples of food products, particularly various types of tomato and cheese sauces, containing this specific blend of HMT potato and native tapioca are provided below in the Examples section. Favorable properties were observed, including a general absence of weeping or syneresis. Microscopy results provided below show that the native tapioca starch had broken down after 1 freeze/thaw cycle; however, the HMT potato starch remained intact through multiple freeze/thaw cycles. This is surprising since keeping the starch intact is typically critical for stability. It is believed that the broken tapioca starch may provide a protective effect to the potato starch over the subsequent freeze/thaw cycles. Similar results were observed for a brown gravy containing the specific blend of HMT potato and native tapioca (63.64 potato/36.36 tapioca or 64 potato/36 tapioca). By comparison, a comparable food product containing HMT potato starch, in the absence of tapioca starch, would commonly have syneresis.

RVA Comparison of Potato/Tapioca Blend with PolarTex 06727

An analysis was done to compare the viscosity profile of an etherified starch (PolarTex 06727 from Cargill, Inc.) to the viscosity profile of a starch blend having 64% (by weight) HMT potato starch (C*Gel 99530 from Cargill, Inc.) and 36% (by weight) native tapioca starch (C*Cream Gel 70001 from Cargill, Inc.).

A Rapid Visco Analyser (RVA) from Perten Instruments (Model RVA4500) was used to measure a viscosity of each of the two compositions as a function of time and temperature, to compare the viscosity profile for the starch blend to the viscosity profile of PolarTex 06727. Each of the compositions was heated to 90 degrees Celsius and held for five (5) minutes and then cooled to 50 degrees Celsius and held for three (3) minutes. The RVA was operated at 160 revolutions per minute (RPM).

FIG. 1A shows the RVA curve for the two compositions at an acidic pH equal to 4. PolarTex 06727 was dosed at 6.0% dry solids and the potato/tapioca blend was dosed at 8.0% dry solids. (The remainder of each composition was de-ionized water.) It can be common to dose at a higher percentage of dry solids (for example, 1 or 2% higher) for a label friendly starch in comparison to a modified starch.

The overall curve of the potato/tapioca composition at an acidic pH is similar to the curve of the PolarTex 06727 composition at an acidic pH.

Figure 1B:
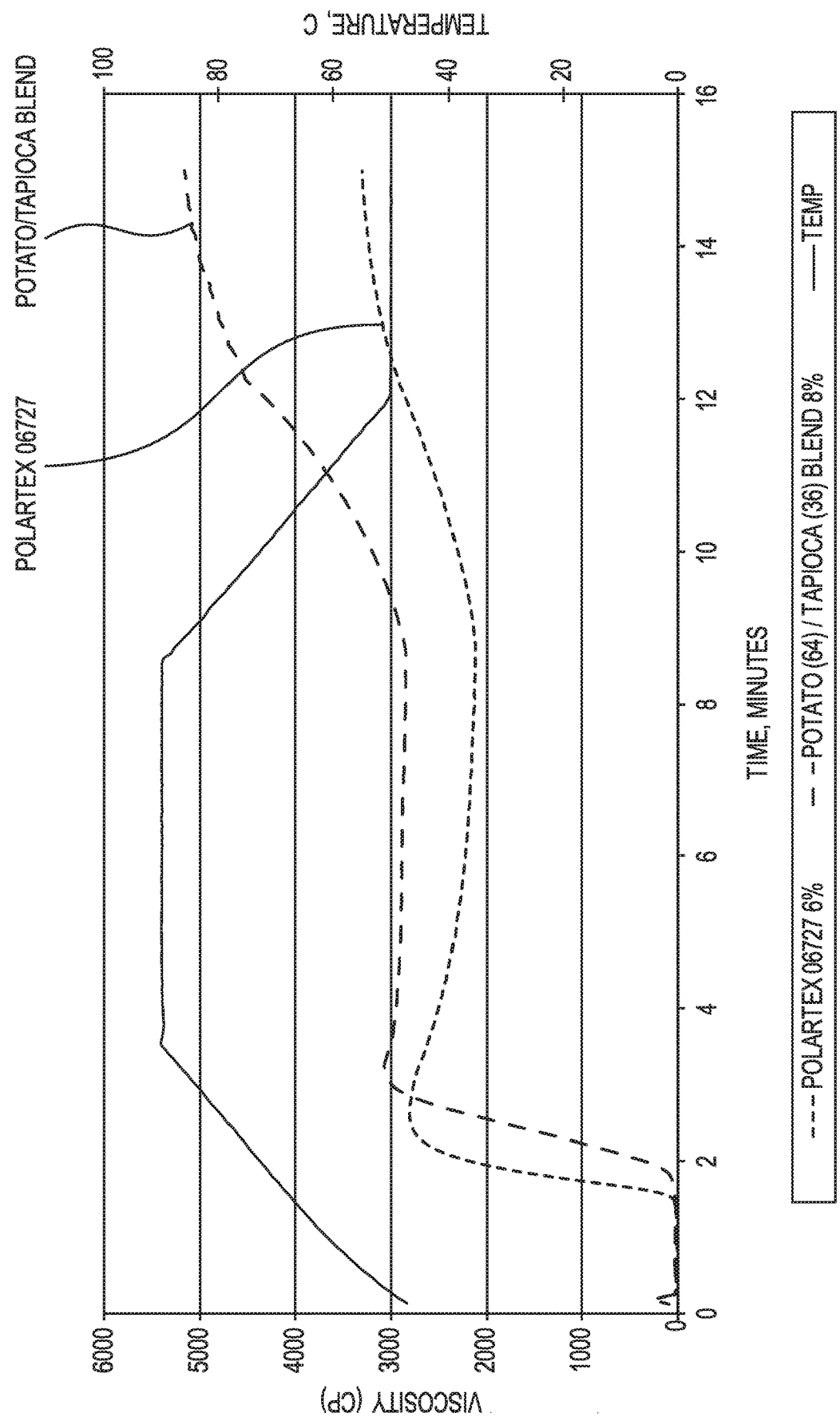
FIG. 1B is a plot of the viscosity profiles for the starch blends of FIG. 1A at a neutral pH.

FIG. 1B shows the RVA curve profile for the same compositions as in FIG. 1A but at a neutral pH equal to 7.

The overall curve of the potato/tapioca composition at a neutral pH is similar to the overall curve of the PolarTex 06727 composition at a neutral pH. As shown in FIG. 1B, the viscosity of the potato/tapioca blend was generally constant from about 4 minutes to about 9 minutes. Although the viscosity of the PolarTex 06727 composition also started to increase around 9 or 10 minutes, the rate of increase was higher for the potato/tapioca blend. Further testing was done to determine if and when the viscosity of the potato/tapioca blend would level off. See FIG. 2.

As shown in FIG. 1B, the potato/tapioca composition shows more thickening, relative to the PolarTex 06727 composition. However, as noted above, the potato/tapioca composition was at a higher dose than the PolarTex 06727 composition. The viscosity levels of the potato/tapioca composition may follow more closely with the PolarTex 06727 composition if dosed at less than 8 percent dry solids (for example, 7 or 7.5%) and at a dose closer to the PolarTex 06727 composition of 6 percent dry solids. See FIG. 3 at 7% dry solids (DS) for the potato/tapioca composition.

Figure 2:
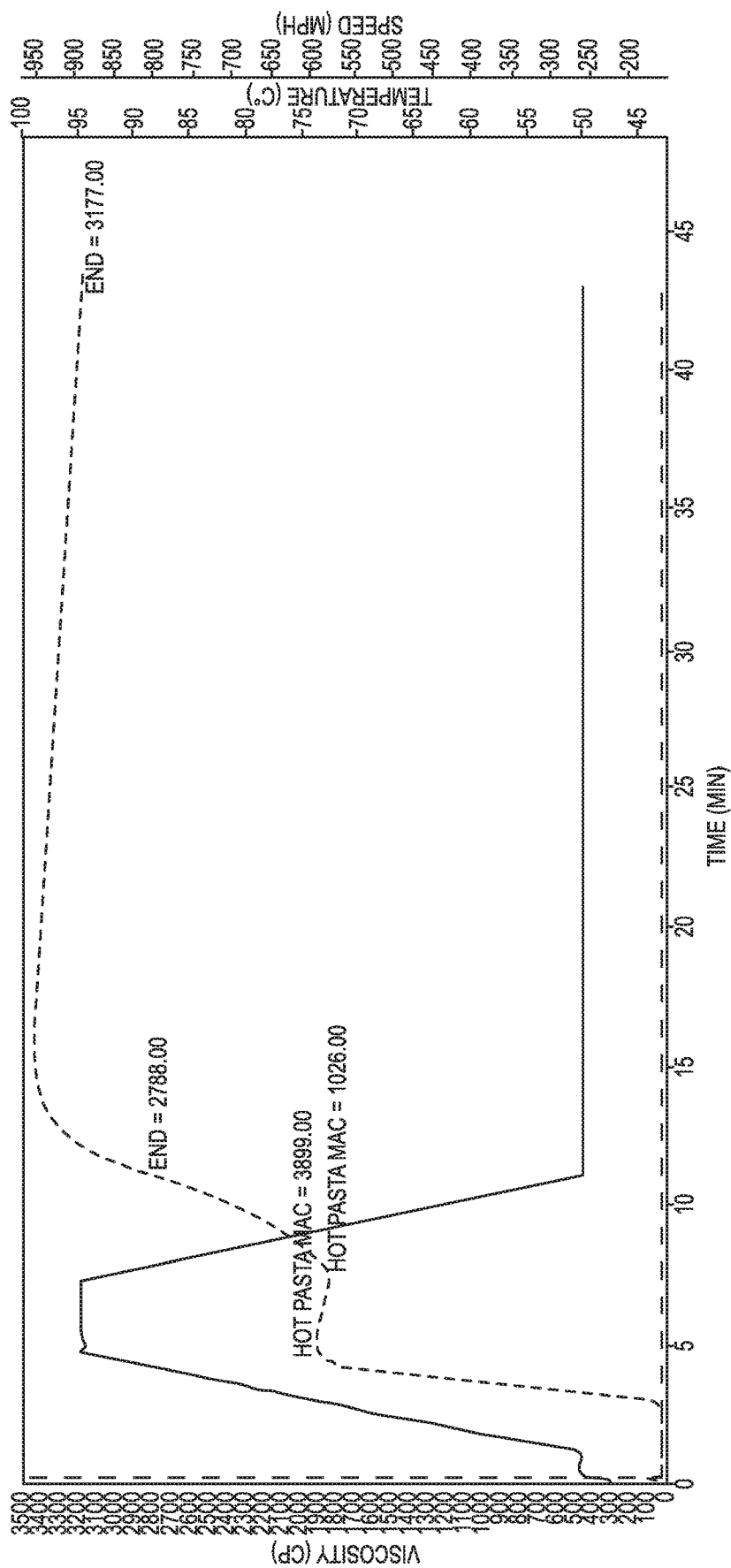
FIG. 2 is a plot of the viscosity profile for the starch blend of potato starch and tapioca starch at a neutral pH over a longer time period as compared to FIG. 1B.

FIG. 2 shows the RVA curve for the potato/tapioca composition for an extended period of time. The viscosity of the potato/tapioca blend reaches a maximum value around 15 minutes and then generally levels off.

Figure 3:
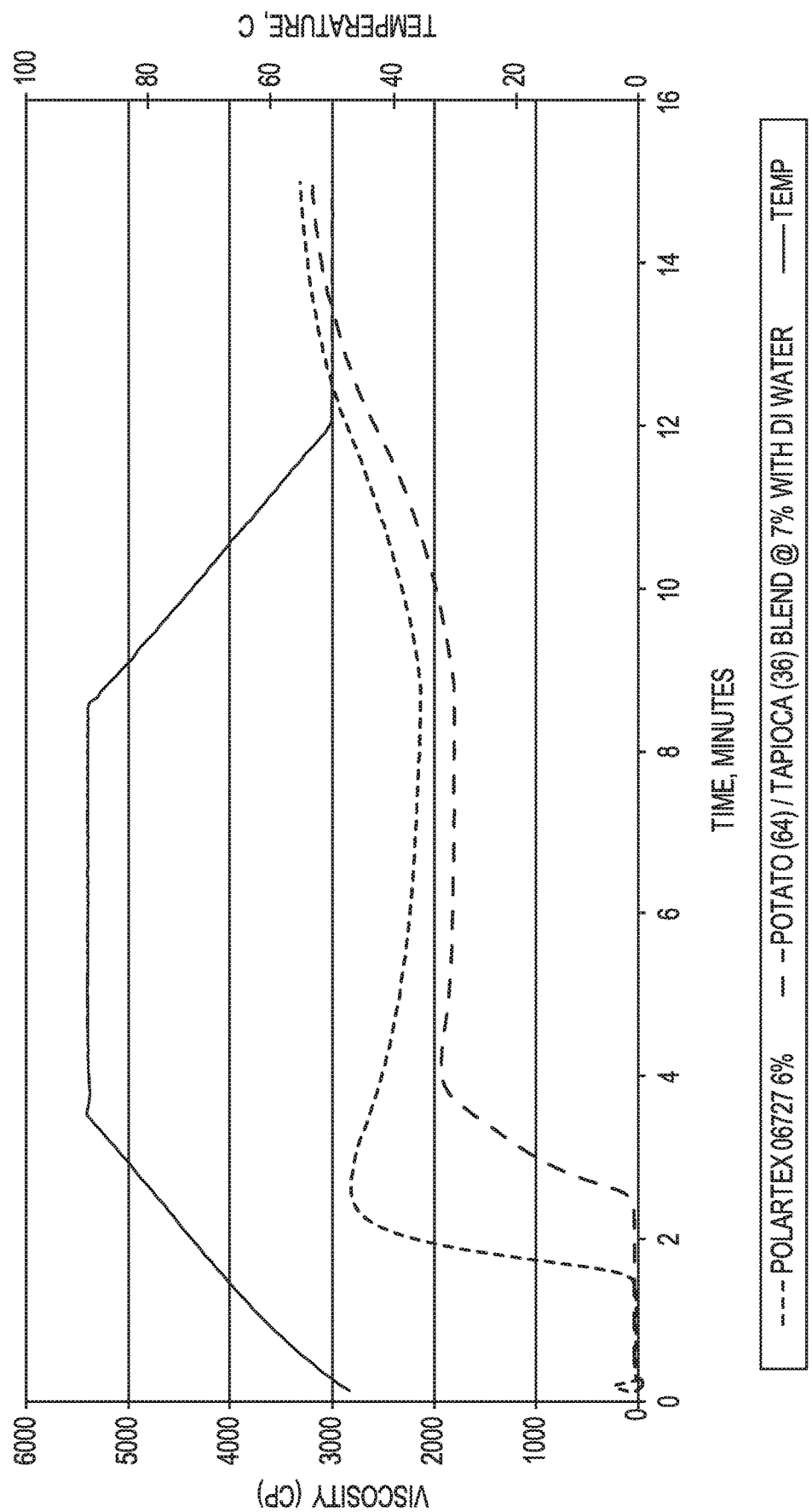
FIG. 3 is a plot of the viscosity profile for the starch blends of FIG. 1B with the potato/tapioca starch blend at 7% dry solids instead of 8% dry solids.

FIG. 3 shows the same RVA curve for the PolarTex 06727 shown in FIG. 1B but the RVA curve for the potato/tapioca composition at 8% dry solids is replaced with a potato/tapioca composition at 7% dry solids. As visible in FIG. 3, the viscosity profile of the potato/tapioca composition at 7% follows more closely with the viscosity profile of the PolarTex 06727 at 6%, as compared to the potato/tapioca composition at 8% which showed higher viscosities relative to the PolarTex 06727.

The results of FIGS. 1A-3 demonstrate that the potato/tapioca composition has a similar viscosity profile to the PolarTex 06727 composition. Given that the potato/tapioca blend is label friendly, the potato/tapioca blend can offer some advantages over the PolarTex 06727 composition in some applications.

RVA Comparison of Different Ratios for Potato and Tapioca

As demonstrated above, the potato/tapioca blend at 64% potato and 36% tapioca showed a similar viscosity profile to a modified starch (PolarTex 06727). An analysis was done to compare the viscosity profile of blends having varying ratios of HMT potato starch to native tapioca starch.

Eleven compositions of potato/tapioca blends at varying levels of potato and tapioca were tested at neutral pH. For each composition, the potato/tapioca blend was dosed at 7% dry solids. The amount of tapioca in the blend ranged between 20 and 70 percent. The amount of potato in the blend ranged between 30 and 80 percent.

Figure 4:
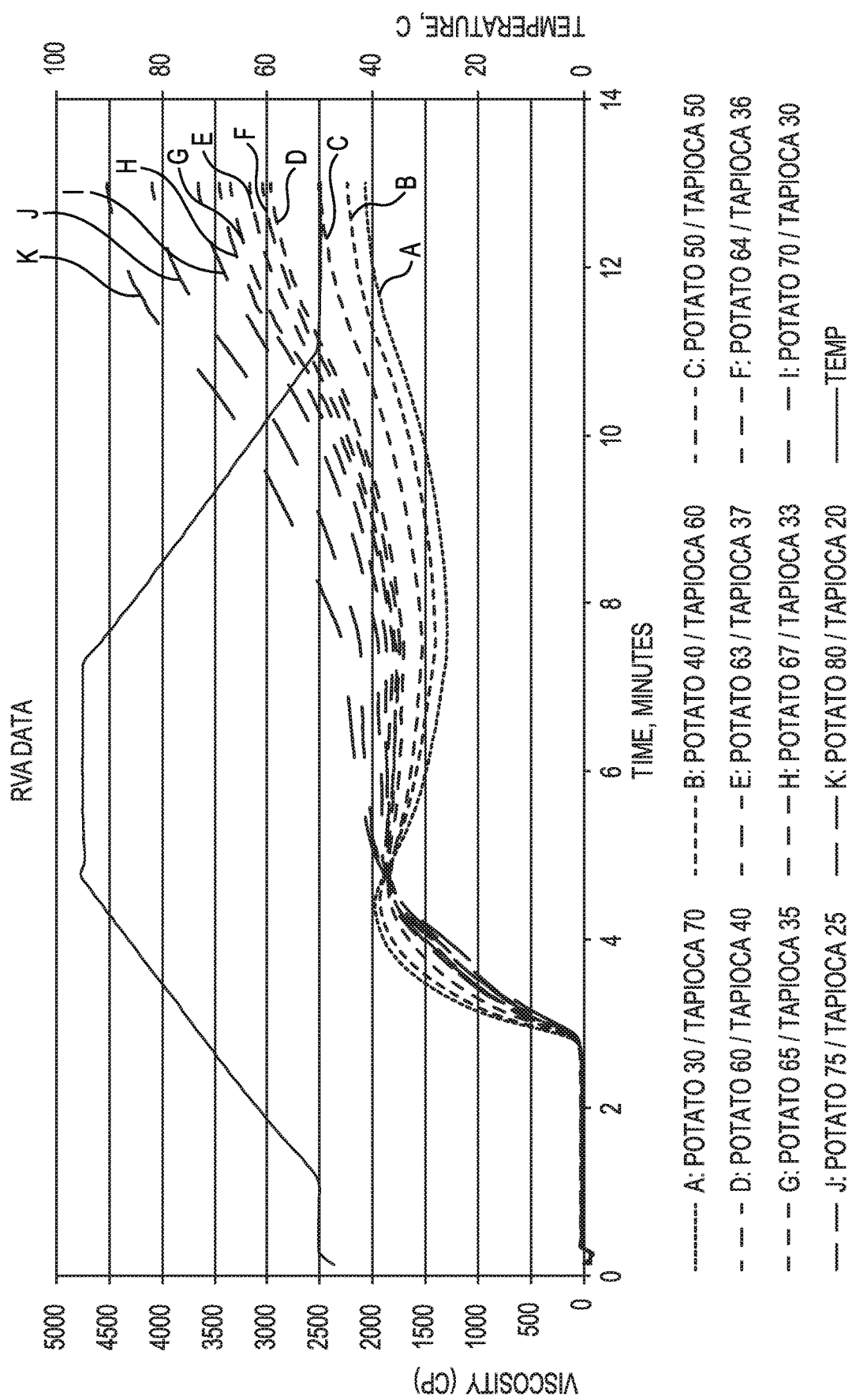
FIG. 4 is a plot of the viscosity profiles of starch blends having varying ratios of potato starch and tapioca starch.

FIG. 4 shows the RVA curve profile for the eleven compositions (labeled as samples A-K in FIG. 4). The viscosity testing was performed at the same conditions and with the same equipment as described above in relation to the comparison of the potato/tapioca blend to PolarTex 06727, as shown in FIGS. 1A, 1B and 3.

The RVA curve of FIG. 4 demonstrates that the viscosity generally increases as a function of an increase in the amount of potato in the potato/tapioca blend. Likewise, the viscosity generally increases as a function of a decrease in the amount of tapioca in the potato/tapioca blend. (There is a reverse correlation shown for samples E and F. Even though sample E had a lower amount of potato relative to sample F, sample E exhibited a slightly higher viscosity. However, the composition was very similar between samples E and F, and the viscosity curves are very similar.)

As shown in FIG. 4, there is a marked difference between the samples having more potato than tapioca (samples D-K), as compared to the sample having equal potato and tapioca (sample C) and the samples having more tapioca than potato (samples A and B). These results demonstrate that the blend can have more favorable properties for use in a food product when the blend contains more potato than tapioca. When the amount of tapioca is less than the amount of potato, not only can the blend have sufficient viscosity, but it appears that the tapioca can provide important functionality to the blend such that the blend can have superior properties or functionality compared to a starch composition of only potato starch. A starch composition formed solely of potato starch can have favorable viscosity; however, weeping or syneresis can be observed. Surprisingly, weeping or syneresis was generally not observed in the food applications provided in the Examples below having the potato/tapioca blend. It is believed that the tapioca starch in the potato/tapioca blend can help avoid or minimize weeping or syneresis that can occur from the potato starch.

As shown in FIG. 4, there is a marked increase in viscosity for the samples having 75 and 80 percent potato (samples J and K) as compared to the samples having 70 percent or less potato (sample I, for example). These results demonstrate that the compositions having at least 75 percent potato exhibit a different viscosity profile as compared to the compositions having an amount of potato at 70 percent or less. FIG. 4 further illustrates that the compositions having an amount of potato ranging between about 60 percent and about 70 percent (samples D-I) have a similar RVA curve. Thus the blend can have favorable properties for use in a food product when the blend contains between about 60 and about 70 percent potato and between about 30 and about 40 percent tapioca.

The present application will be further described in the following examples, which do not limit the scope of the invention in the claims.

EXAMPLES

The starch blend having 64% HMT potato and 36% native tapioca was tested in several food products to validate the viability of the blend in exemplary food products. Each of the food products in the Examples below is intended for use in a freezer meal. Thus the food products need to be able to withstand a kettle cooking process, followed by freezing and then heating in a microwave or oven. Each of the food products in the Examples below included a control sample (containing PolarTex 06727) and a test sample (containing a potato/tapioca starch blend).

Example 1—Marinara Sauce

The control sample was a marinara sauce containing PolarTex 06727 at 1.99% (by weight). The rest of the composition for the control sample is shown in Table 1 below.

TABLE 1

Recipe for Control Marinara Sauce using PolarTex 06727 at 1.99%

| Marinara Sauce | | CONTROL | |
| --- | --- | --- | --- |
| INGREDIENT | SUPPLIER | % | GRAMS |
| Water | | 6.81 6.82 | 102.30 |
| Tomato Paste | Retail | 8.820 8.82 | 132.30 |
| Tomato Puree | Retail | 40.000 40.04 | 601.20 |
| Diced Tomatoes | Retail | 40.000 40.05 | 601.20 |
| POLARTEX 06727 | Cargill | 1.990 1.99 | 29.85 |
| Sugar | Retail | 1.600 1.60 | 24.00 |
| Onion Powder | Retail | 0.080 0.08 | 1.20 |
| Garlic Powder | Retail | 0.080 0.08 | 1.20 |
| Italian Seasoning | Retail | 0.320 0.32 | 4.80 |
| Salt | Cargill | 0.130 0.13 | 1.25 |
| TOTAL | | 100.00 100.00 | 1508.00 |

The test sample was a marinara sauce similar to the control sample, but rather than PolarTex 06727, the test sample contained the starch blend (64% HMT potato and 36% native tapioca) at 3.5% (by weight). The composition of the test sample is shown in Table 2 below.

TABLE 2

Recipe for Test Marinara Sauce using Potato/Tapioca Blend at 3.5%

| TEST Marinara Sauce | | TEST | |
| --- | --- | --- | --- |
| INGREDIENT | SUPPLIER | % | GRAMS |
| Water | Retail | 5.31 5.31 | 79.65 |
| Tomato Paste | Retail | 8.820 8.82 | 132.30 |
| Tomato Puree | Retail | 40.080 40.08 | 601.20 |
| Diced Tomatoes | Cargill | 40.080 40.08 | 601.20 |
| Potato (64)/Tapioca (36) Blend | Retail | 3.500 3.50 | 52.50 |
| Sugar | Retail | 1.600 1.60 | 24.00 |
| Onion Powder | Retail | 0.080 0.08 | 1.20 |
| Garlic Powder | Retail | 0.080 0.08 | 1.20 |
| Italian Seasoning | Retail | 0.320 0.32 | 4.80 |
| Salt | Cargill | 0.130 0.13 | 1.95 |
| TOTAL | | 100.00 100.00 | 1500.00 |

The pH of both samples was equal to 4.19. The ingredients listed in Tables 1 and 2 for the control sample and the test sample, respectively, were added to a Vorwerk Thermomix and mixed on Speed 2.5 until the samples were a homogeneous blend. The samples were then heated to 195° F., held for five minutes and then transferred into storage containers. (Kettle-cooking can be used for a slow cooking process.) The samples were frozen at 0° F. for a minimum of 24 hours. The samples were then microwaved in one minute increments (with stirring in between) until the samples reached a temperature of 190° F. The samples were frozen in a walk-in freezer which provides a slower freezing process than an industrial blast freezer, which is what a customer would typically use. Slower freezing can produce more ice crystals, which can be unfavorable to the starch. Thus by freezing the samples in a walk-in freezer, the samples withstood a "worst case" scenario which establishes the validity of the starch blend for use in freezer meals.

The samples were visually evaluated. Both the control sample and the test sample of marinara sauce did not show any syneresis and were smooth in texture.

Example 2—Vodka Sauce

The control sample was a vodka sauce containing Polar-Tex 06727 at 3.0% (by weight). The rest of the composition for the control sample is shown in Table 3 below.

TABLE 3

Recipe for Control Vodka sauce using PolarTex 06727 at 3.0%
CONTROL Vodka Sauce

| INGREDIENTS | % | GRAMS |
|---|---|---|
| Water | 64.78 | 64.78 | 971.7 |
| Tomato Paste | 10.00 | 10.00 | 150.0 |
| Diced Tomatoes | 10.00 | 10.00 | 150.0 |
| Half & Half | 6.00 | 6.00 | 90.0 |
| Vodka | 5.00 | 5.00 | 75.0 |
| Soy Lecithin (Topcithin UB) | 0.02 | 0.02 | 0.3 |
| Garlic Powder | 0.10 | 0.10 | 1.5 |
| Onion Powder | 0.10 | 0.10 | 1.5 |
| Italian Seasoning | 0.10 | 0.10 | 1.5 |
| Salt | 0.90 | 0.90 | 13.5 |
| PolarTex 06727 | 3.00 | 3.00 | 45.0 |
| TOTAL | 100.00 | 100.00 | 1500.0 |

The test sample was a vodka sauce similar to the control sample, but rather than PolarTex 06727, the test sample contained the starch blend (64% HMT potato and 36% native tapioca) at 4.0% (by weight). The composition of the test sample is shown in Table 4 below.

TABLE 4

Recipe for Test Vodka sauce using Potato/Tapioca blend at 4.0%
TEST Vodka Sauce

| INGREDIENTS | % | GRAMS |
|---|---|---|
| Water | 63.78 | 63.78 | 956.7 |
| Tomato Paste | 10.00 | 10.00 | 150.0 |
| Diced Tomatoes | 10.00 | 10.00 | 150.0 |
| Half & Half | 6.00 | 6.00 | 90.0 |
| Vodka | 5.00 | 5.00 | 75.0 |
| Soy Lecithin (Topcithin UB) | 0.02 | 0.02 | 0.3 |
| Garlic Powder | 0.10 | 0.10 | 1.5 |
| Onion Powder | 0.10 | 0.10 | 1.5 |
| Italian Seasonlng | 0.10 | 0.10 | 1.5 |
| Salt | 0.90 | 0.90 | 13.5 |
| Potato (64)/Tapioca (36) Blend | 4.00 | 4.00 | 60.0 |
| TOTAL | 100.00 | 100.00 | 1500.0 |

A pH of both samples was equal to 4.5. The ingredients listed in Tables 3 and 4 for the control sample and the test sample, respectively, were added to a Vorwerk Thermomix and mixed on Speed 2.5 until the samples were a homogeneous blend. The samples were then heated to 190° F., held for five minutes and then transferred into storage containers. The samples were frozen at 0° F. for a minimum of 24 hours. The samples were then microwaved in one minute increments (with stirring in between) until the samples reached a temperature of 190° F. The samples were visually evaluated.

Both the control sample and the test sample of vodka sauce did not show any syneresis and were smooth in texture.

Example 3—Cheese Sauce

The control sample was a cheese sauce containing Polar-Tex 06727 at 1.99% (by weight). The rest of the composition for the control sample is shown in Table 5 below.

TABLE 5

Recipe for Control Cheese sauce using PolarTex 06727 at 1.99%
CHEESE SAUCE

| | | CONTROL | | |
|---|---|---|---|---|
| INGREDIENT | SUPPLIER | | % | GRAMS |
| Water | | 55.91 | 55.91 | 508.05 |
| Butter, unsalted | Retail | 5.00 | 5.00 | 75.00 |
| Ground Mustard, Yellow #1 | McCormick | 0.20 | 0.20 | 3.00 |
| POLARTEX 06727 | Cargill | 1.99 | 1.99 | 29.85 |
| Garlic Powder | Retail | 0.05 | 0.05 | 0.75 |
| Onion Powder | Retail | 0.05 | 0.05 | 0.75 |
| Salt | Cargill | 0.80 | 0.80 | 12.00 |
| Whole Milk | Retail | 36.00 | 36.00 | 540.00 |
| Sharp Cheddar Cheese (Block, not preshredded) | Retail | 20.00 | 20.00 | 300.00 |
| TOTAL | | 100.00 | 100.00 | 1500.00 |

The test sample was a cheese sauce similar to the control sample, but rather than containing PolarTex 06727, the test sample contained the starch blend (64% HMT potato and 36% native tapioca) at 3.5% (by weight). The composition of the test sample is shown in Table 6 below.

TABLE 6

Recipe for Test Cheese sauce using Potato/Tapioca Blend at 3.5%
TEST CHEESE SAUCE

| | | TEST | | |
|---|---|---|---|---|
| INGREDIENT | SUPPLIER | | % | GRAMS |
| Water | | 34.40 | 34.40 | 516.00 |
| Butter, unsalted | Retail | 5.00 | 5.00 | 75.00 |
| Ground Mustard, Yellow #1 | McCormick | 0.20 | 0.20 | 3.00 |
| Potato (64)/Tapioca (35) Blend | Cargill | 3.50 | 3.50 | 52.50 |
| Garlic Powder | Retail | 0.05 | 0.05 | 0.75 |
| Onion Powder | Retail | 0.05 | 0.05 | 0.75 |
| Salt | Cargill | 0.80 | 0.80 | 12.00 |
| Whole Milk | Retail | 36.00 | 36.00 | 540.00 |
| Sharp Cheddar Cheese (Block, not preshredded) | Retail | 20.00 | 20.00 | 300.00 |
| TOTAL | | 100.00 | 100.00 | 1500.00 |

A pH of both samples was equal to 5.55. The ingredients listed in Tables 5 and 6 for the control sample and the test sample, respectively, were added to a Vorwerk Thermomix, with the exception of the cheese which was added later. The ingredients were mixed on Speed 2.5, then heated to 190° F., and held for five minutes. Next the cheese was added and heated to 165° F. until all cheese was melted, and then transferred into storage containers. The samples were frozen at 0° F. for a minimum of 24 hours. The samples were then microwaved in one minute increments (with stirring in between) until the samples reached a temperature of 190° F. The samples were visually evaluated.

Both the control sample and the test sample of cheese sauce did not show any syneresis and were smooth in texture.

Example 4—Freeze/Thaw Stability for Marinara Sauce

A test sample and a control sample were prepared for a marinara sauce. Each sample had a composition that was the same as those shown in Tables 1 and 2 of Example 1, with the exception that the test sample included PolarTex 06732 in place of PolarTex 06727. Both PolarTex 06727 and PolarTex 06732 have similar compositions and properties; both have low to moderate cross-linking and are considered as a high or highly hydroxypropylated (HP) substituted starch.

Once the test and control samples in this example were made using the steps provided under Example 1, the samples were subject to multiple freeze-thaw cycles. The samples were placed in a freezer for 24 hours, removed for 4 hours (and left at room temperature) and then placed back in the freezer for 24 hours. After the freeze/thaw cycles were complete, the samples were removed from the freezer and microwaved for about 4 minutes (stirring at one minute intervals) at about 1200 watts until the samples reached a temperature of 195° F. Viscosity measurements were taken with a Bostwick Viscometer at 160° F. for 15 seconds.

Figure 5:
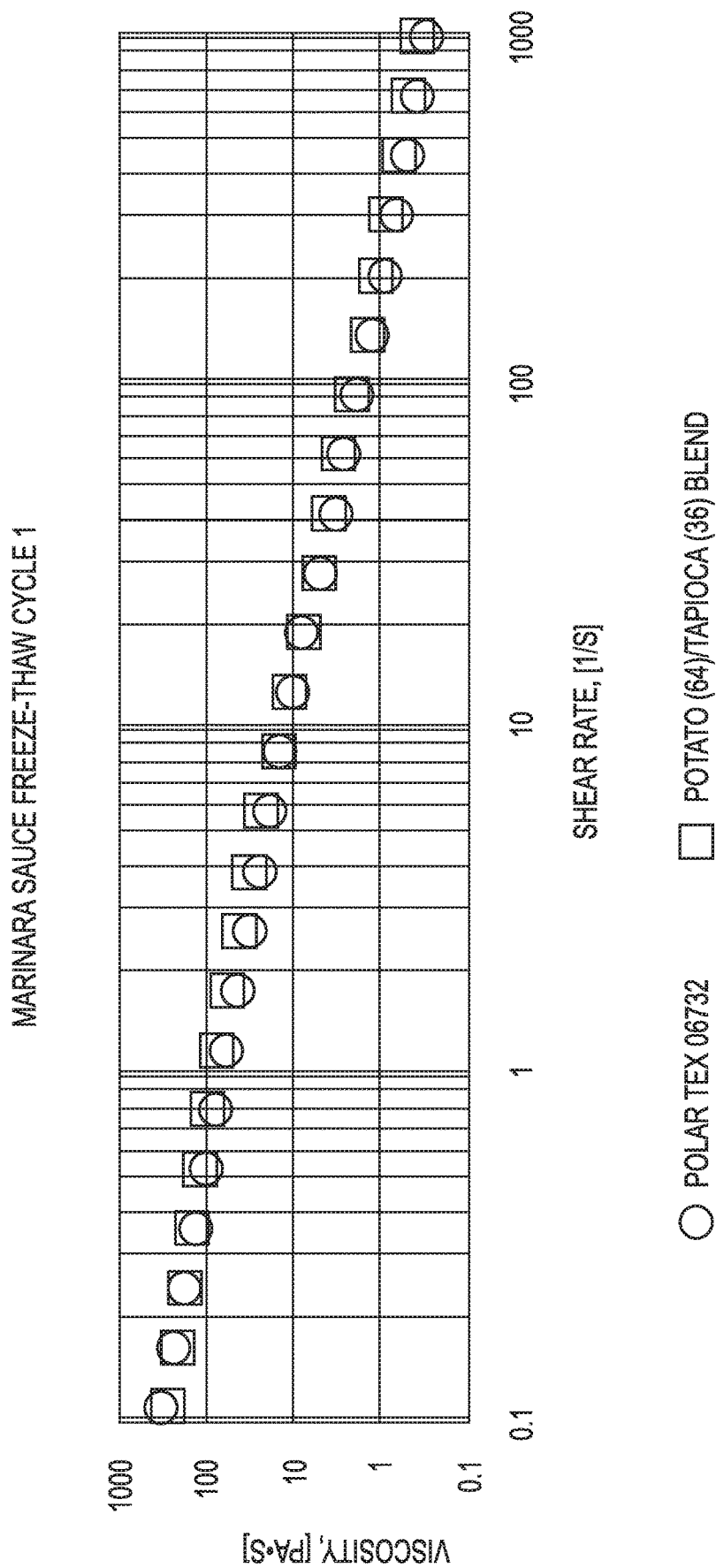
FIG. 5 is a plot of viscosity as a function of shear rate, comparing a marinara sauce having a modified starch to a marinara sauce having a potato/tapioca starch blend, after a freeze thaw cycle 1.
Figure 6:
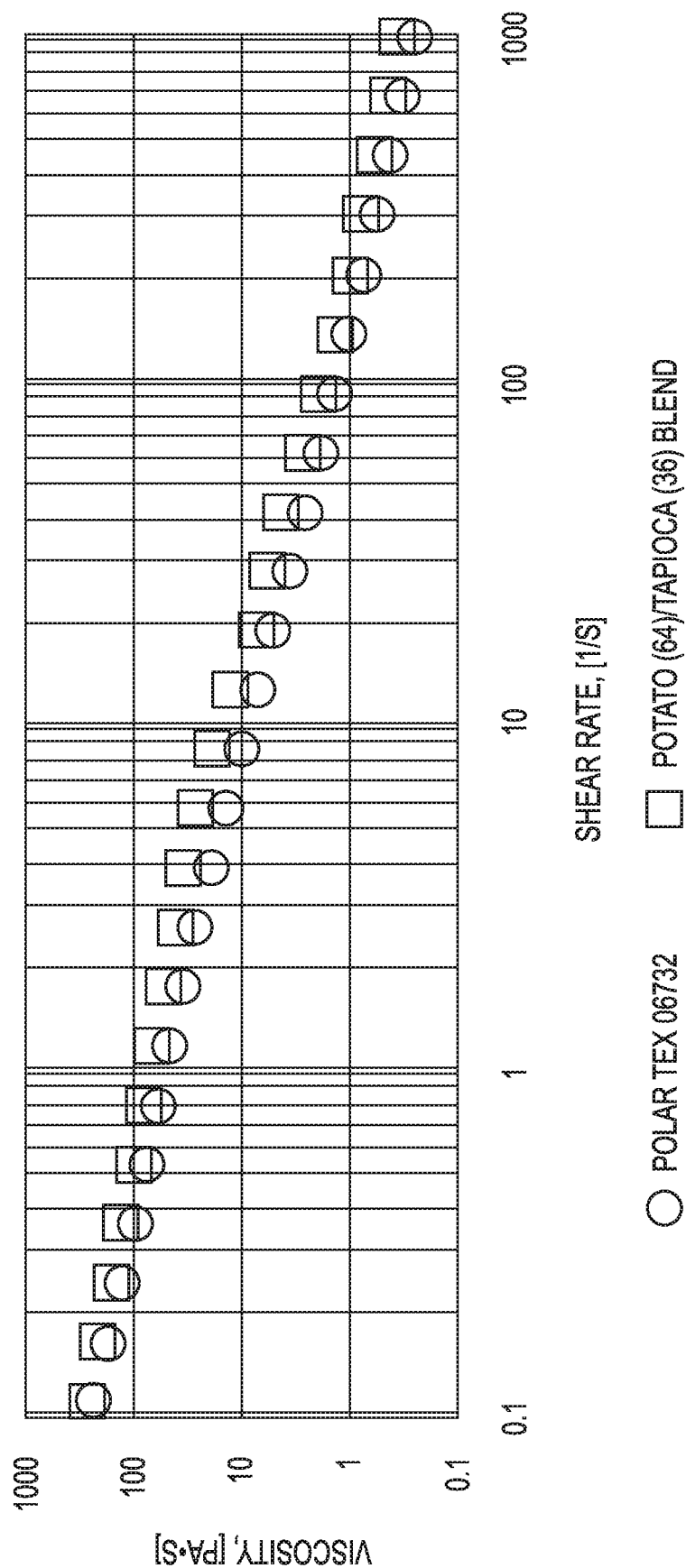
FIG. 6 is a plot of viscosity of the marinara sauces of FIG. 5 after a freeze thaw cycle 5.
Figure 7:
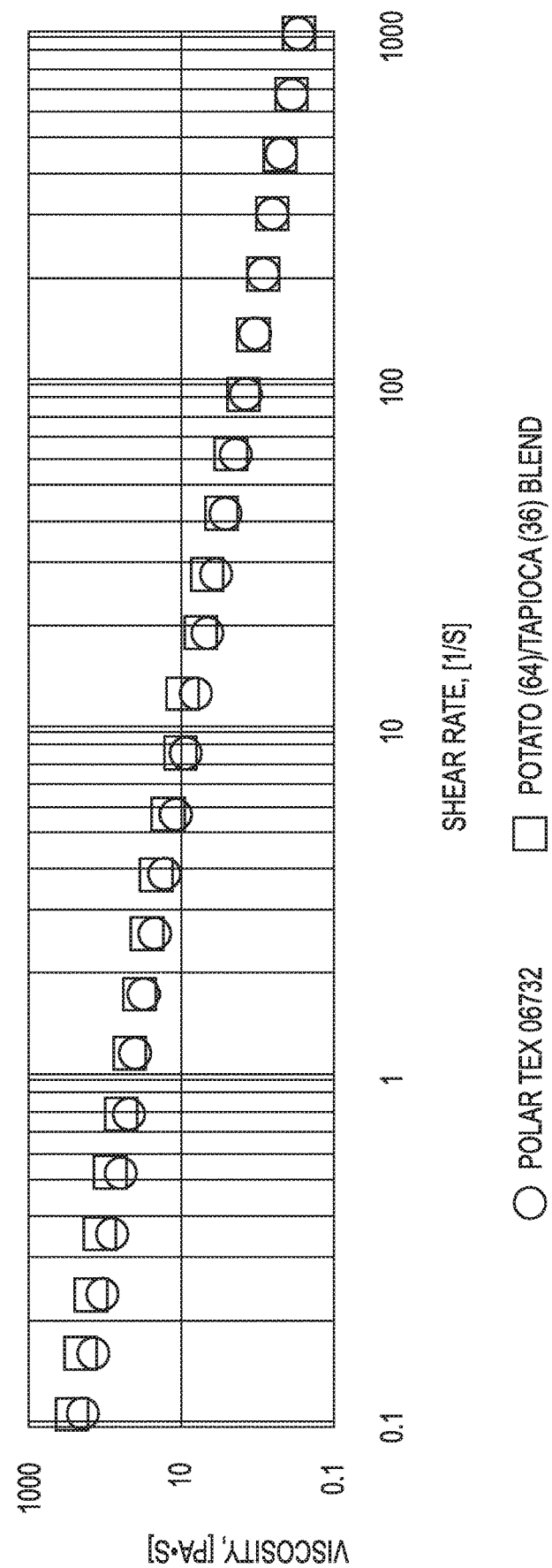
FIG. 7 is a plot of viscosity of the marinara sauces of FIG. 5 after a freeze thaw cycle 10.

FIG. 5 shows the viscosity of the test and control samples for the marinara sauce after Freeze-Thaw Cycle 1. FIG. 6 shows the viscosity of the test and control samples after Freeze-Thaw Cycle 5. FIG. 7 shows the viscosity of the test and control samples after Freeze-Thaw Cycle 10. The results in FIGS. 5-7 demonstrate that the viscosity of the marinara sauce containing the potato/tapioca blend is very similar to the viscosity of the marinara sauce containing PolarTex 06732. The potato/tapioca blend appears to perform similarly, if not better, than the modified starch (PolarTex 06732).

Figure 8:
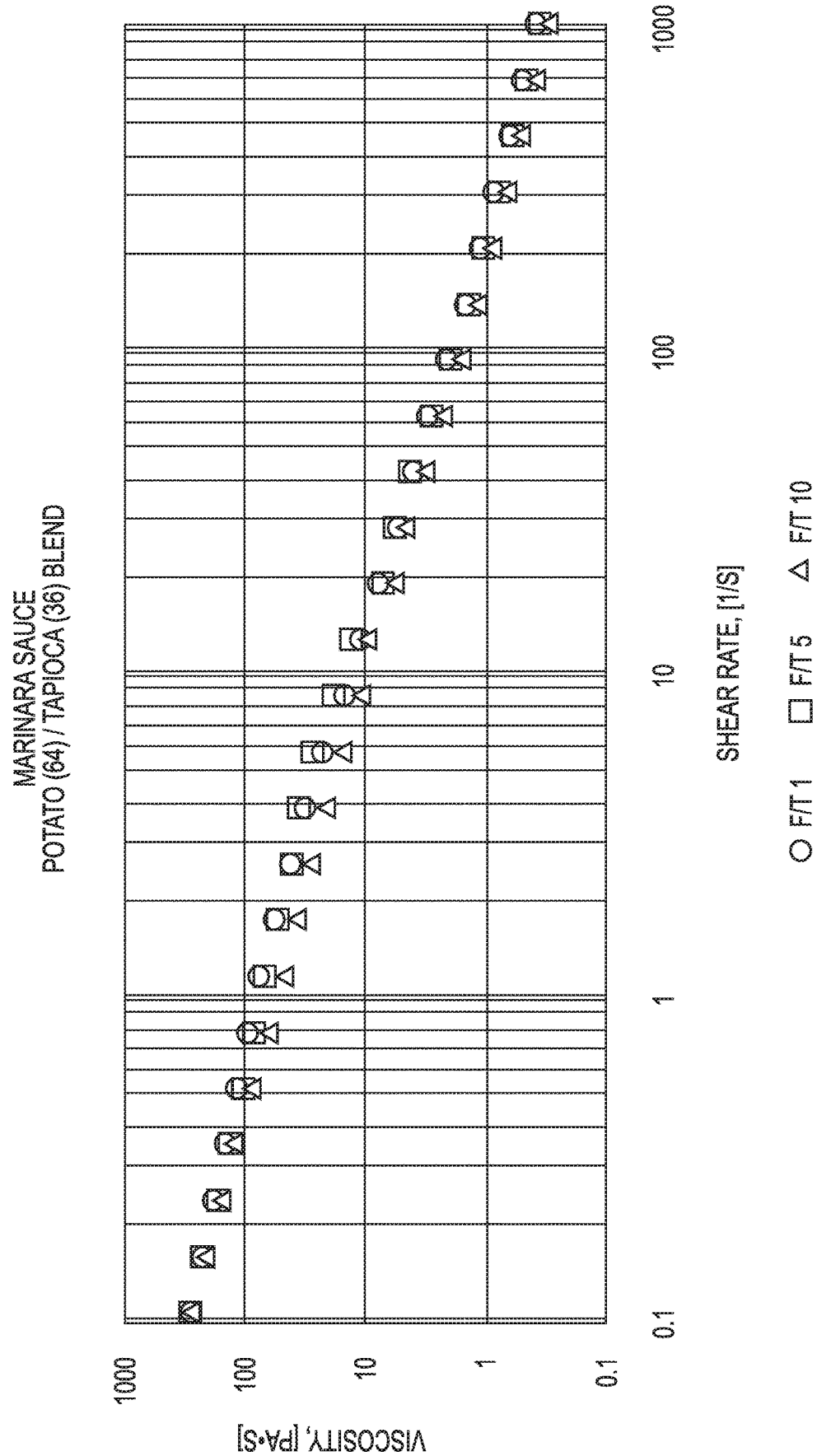
FIG. 8 is a plot of viscosity of the marinara sauces having the potato/tapioca starch blend after freeze thaw cycles 1, 5 and 10.

FIG. 8 compares the viscosity of the marinara test sample at each of the cycles shown in FIGS. 5-7. FIG. 8 demonstrates that the viscosity of the marinara sauce containing the potato/tapioca blend generally did not change between Freeze-Thaw Cycle 1 and Freeze-Thaw Cycle 10.

Figure 9:
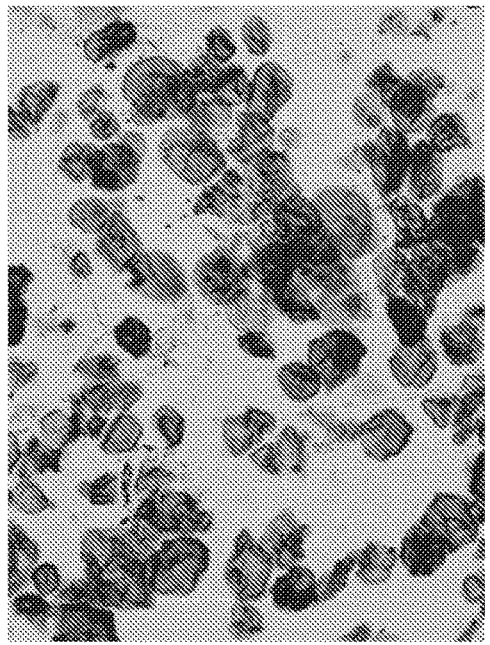
FIGS. 9-11 are microscopy images of the marinara sauce having the modified starch after freeze thaw cycles 1, 5 and 10.
Figure 10:
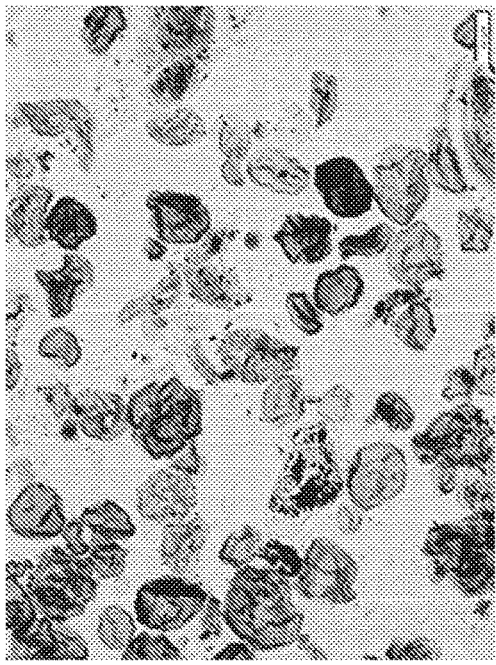
Figure 11:
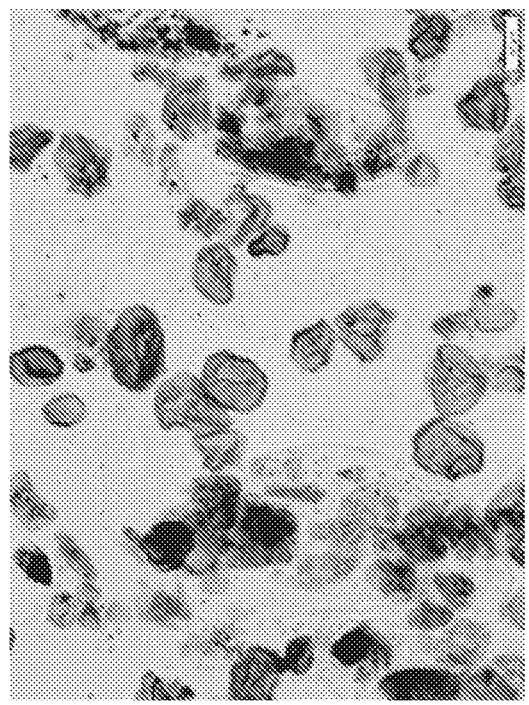

FIGS. 9-11 show microscopy images of the control sample of the marinara sauce containing PolarTex 06732 at Freeze-Thaw Cycles 1, 5 and 10. These images demonstrate that PolarTex 06732 performed well in the sauce from Cycle 1 to 10.

Figure 12:
FIGS. 12-14 are microscopy images of the marinara sauce having the potato/tapioca starch blend after freeze thaw cycles 1, 5 and 10.
Figure 13:
Figure 14:

FIGS. 12-14 show microscopy images of the test sample of the marinara sauce containing Potato (64)/Tapioca (36) blend at Freeze-Thaw Cycles 1, 5 and 10. These images demonstrate that the tapioca starch is already broken after Cycle 1; however, the HMT potato starch remains intact through Cycle 10. This was surprising and not typical. Generally in food applications similar to this, it can be critical for stability for the starch to remain intact. Even with the tapioca starch breaking down after cycle 1, the starch blend in the test marinara sauce continued to perform successfully and maintain stability, despite there being some damage to the starch blend, specifically to the tapioca starch.

Example 5—Freeze/Thaw Stability for Cheese Sauce

A test sample and a control sample were prepared for a cheese sauce. Each sample had a composition that was the same as those shown in Tables 5 and 6 of Example 3, with the exception that the test sample included PolarTex 06732 in place of PolarTex 06727.

Once the test and control samples in this example were made using the steps provided under Example 1, the samples were subject to multiple freeze-thaw cycles, as described above under Example 4. The viscosity measurements were taken with a Bostwick Viscometer as also described above under Example 4.

Figure 15:
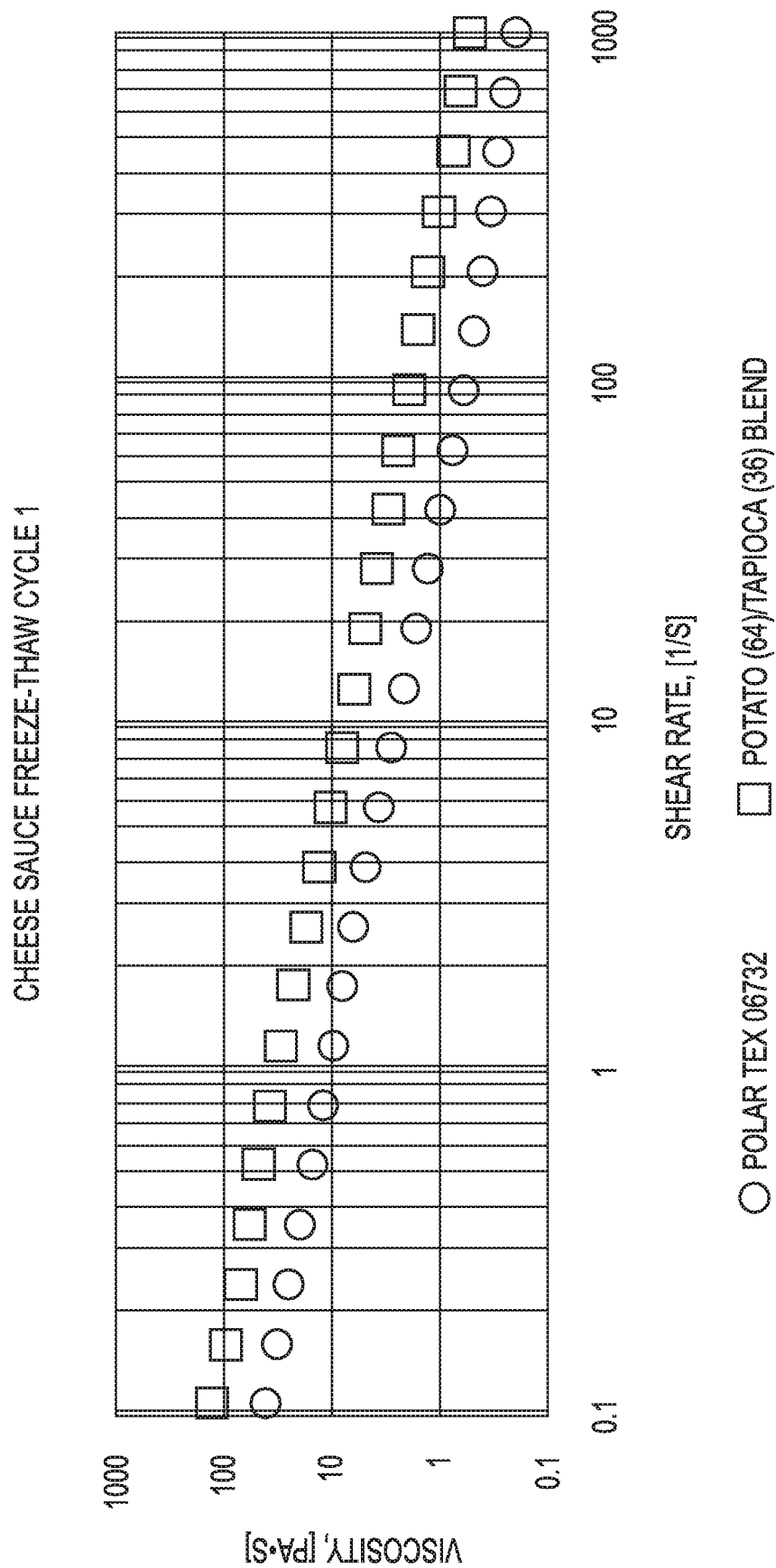
FIG. 15 is a plot of viscosity as a function of shear rate, comparing a cheese sauce having a modified starch to a cheese sauce having a potato/tapioca starch blend, after a freeze thaw cycle 1.
Figure 16:
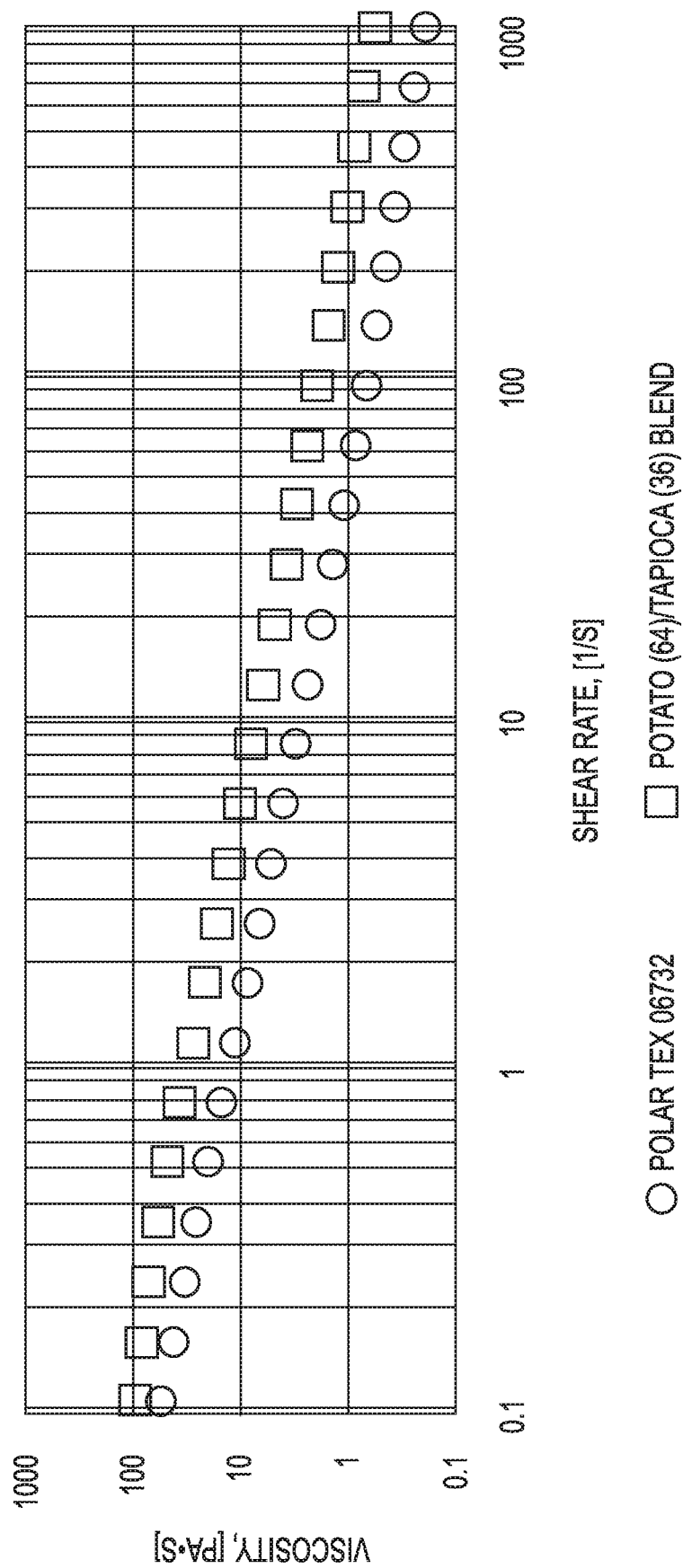
FIG. 16 is a plot of viscosity of the cheese sauces of FIG. 15 after a freeze thaw cycle 5.
Figure 17:
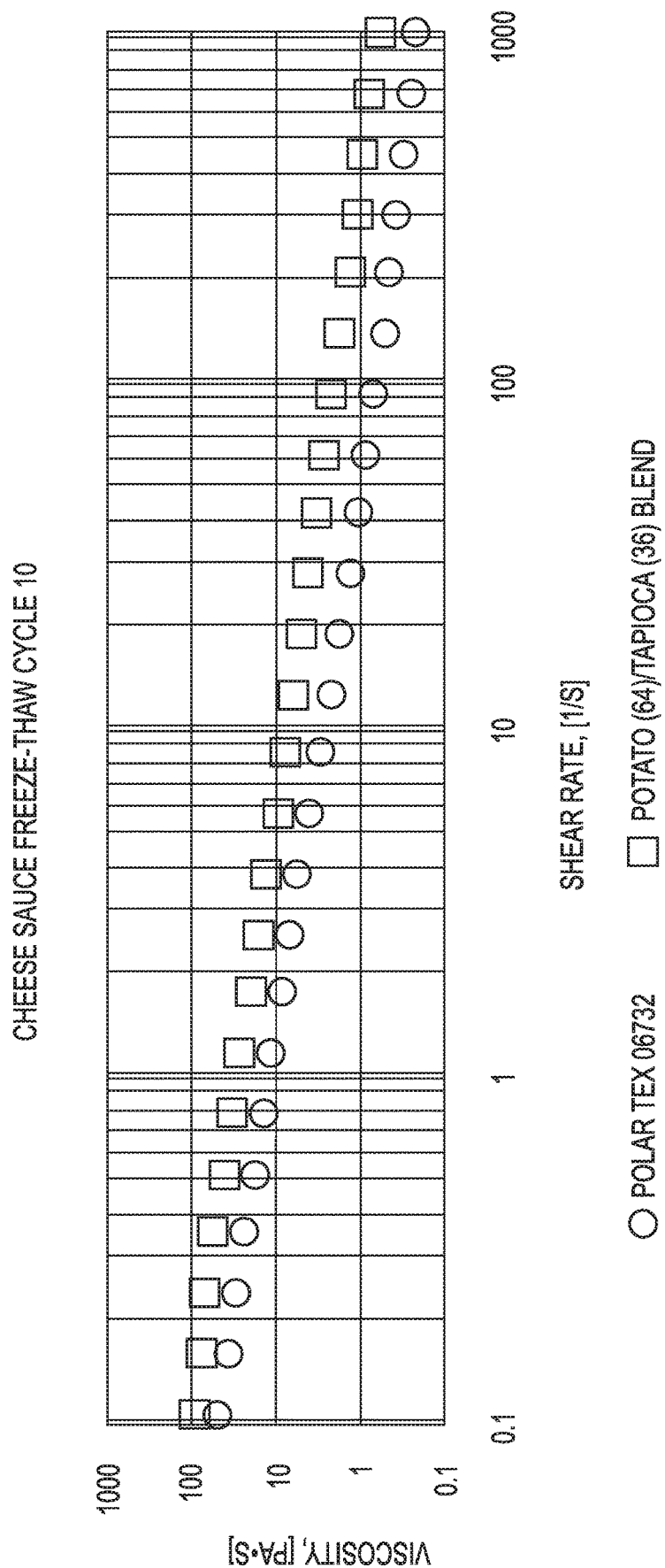
FIG. 17 is a plot of viscosity of the cheese sauces of FIG. 15 after a freeze thaw cycle 10.

FIG. 15 shows the viscosity of the test and control samples for the cheese sauce after Freeze-Thaw Cycle 1. FIG. 16 shows the viscosity of the test and control samples after Freeze-Thaw Cycle 5. FIG. 17 shows the viscosity of the test and control samples after Freeze-Thaw Cycle 10. The results in FIGS. 15-17 demonstrate that the viscosity of the cheese sauce containing the potato/tapioca blend is similar, if not higher, than the viscosity of the cheese sauce containing the modified starch (PolarTex 06732). The potato/tapioca blend may actually exhibit superior performance in terms of viscosity over time and freeze/thaw cycles, relative to the modified starch.

Figure 18:
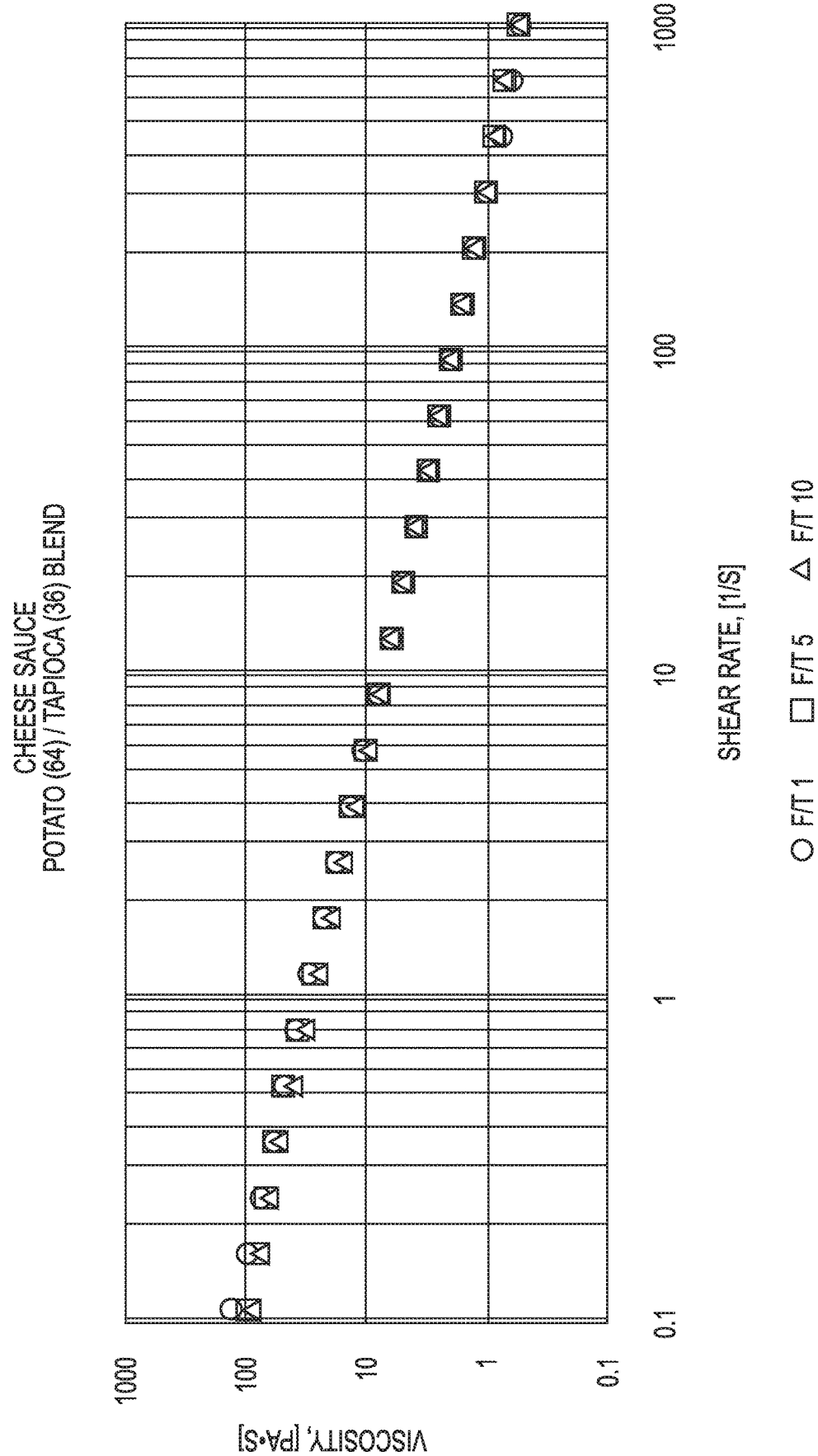
FIG. 18 is a plot of viscosity of the cheese sauces having the potato/tapioca starch blend after freeze thaw cycles 1, 5 and 10.

FIG. 18 compares the viscosity of the cheese sauce test sample at each of the cycles shown in FIGS. 15-17 and demonstrates that the viscosity of the test sample remains generally constant over the freeze-thaw cycles.

Figure 19:
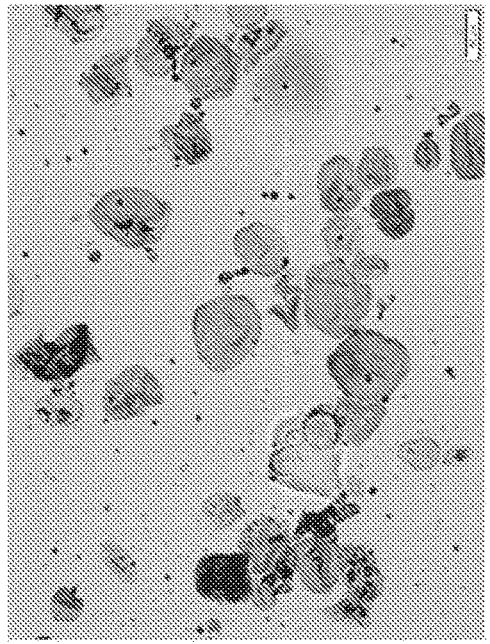
FIGS. 19-21 are microscopy images of the cheese sauce having the modified starch after freeze thaw cycles 1, 5 and 10.
Figure 20:
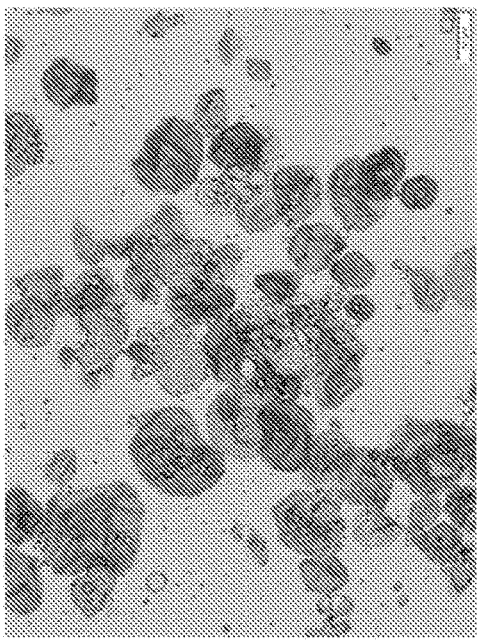
Figure 21:
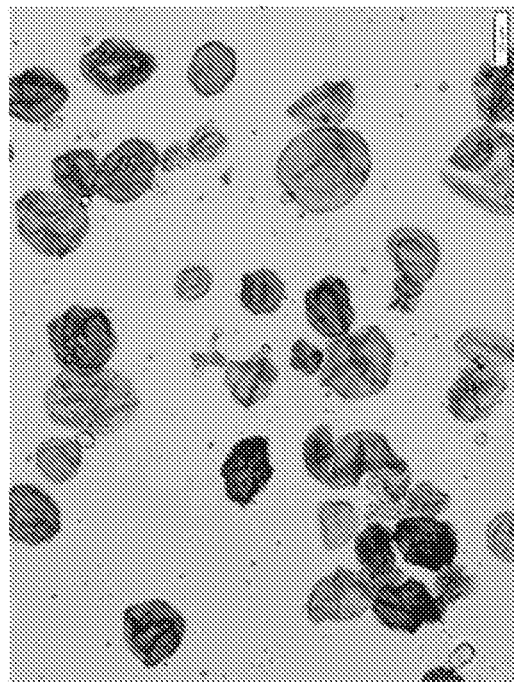

FIGS. 19-21 show microscopy images of the control sample of the cheese sauce containing PolarTex 06732 at Freeze-Thaw Cycles 1, 5 and 10. Similar to the control sample of the marinara sauce in Example 4, the images in FIGS. 19-21 demonstrate that PolarTex 06732 performed well in the cheese sauce over the various cycles.

Figure 22:
FIGS. 22-24 are microscopy images of the cheese sauce having the potato/tapioca starch blend after freeze thaw cycles 1, 5 and 10.
Figure 23:
Figure 24:

FIGS. 22-24 show microscopy images of the test sample of the cheese sauce containing Potato (64)/Tapioca (36) blend at Freeze-Thaw Cycles 1, 5 and 10. Similar to the test sample of the cheese sauce in Example 4, the images in FIGS. 22-24 show that the tapioca starch breaks down while the HMT potato starch remains intact.

The food products in Examples 1-5 are provided to demonstrate the viability of the potato/tapioca blend for use within a neutral or acidic sauce that underwent a cooking process, was frozen and then later heated for consumption. It is recognized that the potato/tapioca blends disclosed herein can be suitable for use within other food products, in addition to those specifically focused on herein. Similarly, although the blend at 64% potato and 36% tapioca is focused on herein, other ratios of potato to tapioca are within the scope of the present application and are suitable for use within the various food product, particularly those ratios in which the amount of potato is greater than the amount of tapioca.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A starch composition comprising:
   a heat-moisture treated (HMT) potato starch in an amount ranging between about 60 and about 70 weight percent of the starch composition; and
   a native tapioca starch in an amount ranging between about 30 and about 40 weight percent of the starch composition, wherein the amount of HMP potato starch is greater than the amount of the native tapioca starch, wherein the starches in the starch composition are not chemically modified and the starch composition exhibits freeze/thaw stability over multiple freeze/thaw cycles, wherein the viscosity of the starch composition after 5 freeze/thaw cycles is similar to the viscosity after one freeze/thaw cycle, wherein the starch composition minimizes or eliminates syneresis, and wherein the only starch in the composition is the HMT potato starch and the native tapioca starch.

2. The starch composition of claim 1 wherein the HMT potato starch ranges between about 63 and about 67 weight percent of the starch composition and the native tapioca starch ranges between about 33 and about 37 weight percent of the starch composition.

3. The starch composition of claim 1 wherein the HMT potato starch is about 63.6 weight percent of the starch composition and the native tapioca starch is about 33.3 weight percent of the starch composition.

4. A food product that includes the starch composition of claim 1, wherein the food product is cooked and then stored in a freezer, prior to heating and consumption at a future date.

5. The food product of claim 4 wherein the food product is a tomato-based sauce or a cheese sauce.

6. The food product of claim 4 wherein the food product is at a pH of at least about 4.6 or at most about 4.5.

7. A starch blend comprising:
   a potato starch in a first amount, the potato starch having undergone a heat-moisture treatment prior to forming the blend; and
   a native tapioca starch in a second amount, wherein the first and second amounts are each defined in terms of a weight percent of the blend, wherein the first amount is between about 60 and 70 weight percent and the second amount is between about 30 and 40 weight percent, wherein the first amount is greater than the second amount, wherein the starches in the starch blend are not chemically modified and the starch blend exhibits freeze/thaw stability over multiple freeze/thaw cycles, wherein the viscosity of the starch blend after 5 freeze/thaw cycles is similar to the viscosity after one freeze/thaw cycle, wherein the starch blend minimizes or eliminates syneresis, and wherein the only starch in the starch blend is the HMT potato starch and the native tapioca starch.

8. The starch blend of claim 7 wherein the first amount is between about 60 and 65 weight percent and the second amount is between about 35 and 40 weight percent.

9. The starch blend of claim 7 wherein the first amount ranges between about 63 and 64 weight percent and the second amount ranges between about 36 and 37 weight percent.

10. A food product incorporating the starch blend of claim 7, wherein the food product is a sauce, a cheese-based sauce, a tomato-based sauce or wherein the food product is part of a freezer meal configured for storage at a temperature less than or equal to about 0° F., prior to consumption of the freezer meal.

11. A method of making a label friendly starch blend, the method comprising:
    producing or providing a heat-moisture treated (HMT) potato starch;
    producing or providing a native tapioca starch;
    blending the HMT potato starch with the native tapioca starch to form the label friendly starch blend comprising a first amount of the HMT potato starch and a second amount of the native tapioca starch, wherein the first and second amounts are each defined in terms of a weight percent of the blend, wherein the first amount is between about 60 and 70 weight percent and the second amount is between about 30 and 40 weight percent, wherein the first amount is greater than the second amount, wherein the label friendly starch blend exhibits freeze/thaw stability over multiple freeze/thaw cycles, wherein the viscosity of the starch blend after 5 freeze/thaw cycles is similar to the viscosity after one freeze/thaw cycle, wherein the starch blend minimizes or eliminates syneresis, and wherein the only starch in the starch blend is the HMT potato starch and the native tapioca starch.

12. The method of claim 11 wherein the first amount ranges between about 63 and 64 weight percent and the second amount ranges between about 36 and 37 weight percent.

13. A method of making a food product containing a label friendly starch, the method comprising:
producing or providing a label-friendly starch blend comprising a heat-moisture treated (HMT) potato starch and a native tapioca starch, the HMT potato in an amount ranging between about 60 and about 70 weight percent of the starch blend and the native tapioca starch in an amount ranging between about 30 and about 40 weight percent of the starch blend;
combining the starch blend with one or more additional food ingredients;
heating the starch blend and the one or more additional food ingredients to form the food product; and
freezing the food product prior to delivering the food product to a retailer or a consumer, wherein the food product exhibits freeze/thaw stability over multiple freeze/thaw cycles, wherein the viscosity of the starch composition after 5 freeze/thaw cycles is similar to the viscosity after one freeze/thaw cycle, wherein the starch blend minimizes or eliminates syneresis in the food product, and wherein the only starch in the starch blend is the HMT potato starch and the native tapioca starch.

14. The method of claim 13 wherein the food product is a first food product and the method further comprises combining the first food product with a second food product to form a freezer meal.

15. The method of claim 14 wherein the first food product is a tomato-based sauce or a cheese-based sauce.

16. The method of claim 15 wherein the second food product comprises pasta noodles.

17. The method of claim 13 further comprising:
storing the food product in a freezer for a period of time;
removing the food product from the freezer; and
preparing the food product for consumption.

18. The method of claim 13 wherein the HMT potato is in an amount ranging between about 63 and about 67 weight percent of the starch blend and the native tapioca starch is in an amount ranging between about 33 and about 37 weight percent of the starch blend.

19. The method of claim 13 wherein the HMT potato is in an amount ranging between about 63 and about 64 weight percent of the starch blend and the native tapioca starch is in an amount ranging between about 36 and about 37 weight percent of the starch blend.

* * * * *

UNITED STATES PATENT AND TRADEMARK OFFICE
CERTIFICATE OF CORRECTION

PATENT NO. : 12,465,072 B2
APPLICATION NO. : 17/260083
DATED : November 11, 2025
INVENTOR(S) : Erin Marie Radermacher et al.

It is certified that error appears in the above-identified patent and that said Letters Patent is hereby corrected as shown below:

In the Specification

In Column 8, Line 04, table 1: delete "6.81" and insert -- 6.82 --, therefor.
In Column 8, Line 06, table 1: delete "40.000" and insert -- 40.080 --, therefor.
In Column 8, Line 06, table 1: delete "40.04" and insert -- 40.08 --, therefor.
In Column 8, Line 07, table 1: delete "40.000" and insert -- 40.080 --, therefor.
In Column 8, Line 07, table 1: delete "40.05" and insert -- 40.08 --, therefor.
In Column 8, Line 13, table 1: delete "1.25" and insert -- 1.95 --, therefor.
In Column 8, Line 14, table 1: delete "1508.00" and insert -- 1500.00 --, therefor.
In Column 8, Line 04, table 2: delete "Retail".
In Column 8, Line 07, table 2: delete "Cargill" and insert -- Retail --, therefor.
In Column 8, Line 08, table 2: delete "Retail" and insert -- Cargill --, therefor.
In Column 10, Line 04, table 5: delete "55.91" and insert -- 35.91 --, therefor.
In Column 10, Line 04, table 5: delete "508.05" and insert -- 538.65 --, therefor.
In Column 10, Line 07, table 6: delete "(35)" and insert -- (36) --, therefor.

Signed and Sealed this
Thirtieth Day of December, 2025

John A. Squires
*Director of the United States Patent and Trademark Office*